United States Patent
Yamaguchi

(10) Patent No.: US 11,931,841 B2
(45) Date of Patent: Mar. 19, 2024

(54) PREDICTION DEVICE

(71) Applicant: FANUC CORPORATION, Yamanashi (JP)

(72) Inventor: Meguru Yamaguchi, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 796 days.

(21) Appl. No.: 16/935,272

(22) Filed: Jul. 22, 2020

(65) Prior Publication Data
US 2021/0031322 A1 Feb. 4, 2021

(30) Foreign Application Priority Data
Jul. 30, 2019 (JP) ................... 2019-139531

(51) Int. Cl.
- B23Q 17/00 (2006.01)
- B23H 7/08 (2006.01)
- B23Q 17/09 (2006.01)
- G05B 19/4069 (2006.01)

(52) U.S. Cl.
CPC ............ B23Q 17/008 (2013.01); B23H 7/08 (2013.01); B23Q 17/0995 (2013.01); G05B 19/4069 (2013.01)

(58) Field of Classification Search
CPC . B23H 11/00; B23H 7/08; B23H 7/10; B23H 7/20; B23Q 17/008; B23Q 17/0995; G05B 19/4069; G05B 2219/32234; G05B 2219/33034; G05B 2219/45043; G05B 23/0283
See application file for complete search history.

(56) References Cited

U.S. PATENT DOCUMENTS

| | | | |
|---|---|---|---|
| 2010/0038258 A1* | 2/2010 | Lin | B23H 7/02 204/275.1 |
| 2015/0202701 A1 | 7/2015 | Hara | |
| 2016/0096231 A1 | 4/2016 | Nishikawa et al. | |
| 2018/0266935 A1 | 9/2018 | Jaques et al. | |

(Continued)

FOREIGN PATENT DOCUMENTS

| | | |
|---|---|---|
| JP | H05305520 A | 11/1993 |
| JP | 07-178622 A | 7/1995 |
| JP | 2003053628 A | 2/2003 |

(Continued)

*Primary Examiner* — Dana Ross
*Assistant Examiner* — Joe E Mills, Jr.
(74) *Attorney, Agent, or Firm* — Robert P. Michal, Esq.; Carter, DeLuca & Farrell LLP

(57) ABSTRACT

Provided is a prediction device, to which one or more wire electrical discharge machines are connected, the one or more wire electrical discharge machines each performing machining on an object to be machined according to a predetermined machining condition while moving a wire electrode relatively with respect to the object to be machined along a machining path, the prediction device including a prediction unit that predicts, for a predetermined component constituting the wire electrical discharge machine, a predicted rate of consumption indicative of a rate of consumption based on the machining condition when the wire electrode is moved relatively by a unit distance, and a display unit that displays the predicted rate of consumption of the component.

7 Claims, 6 Drawing Sheets

(56) References Cited

U.S. PATENT DOCUMENTS

2019/0369598 A1   12/2019   Kubo

FOREIGN PATENT DOCUMENTS

| | | |
|---|---|---|
| JP | 2004358573 A | 12/2004 |
| JP | 2005224943 A | 8/2005 |
| JP | 2015-003352 A | 1/2015 |
| JP | 2020074177 A | 5/2020 |

* cited by examiner

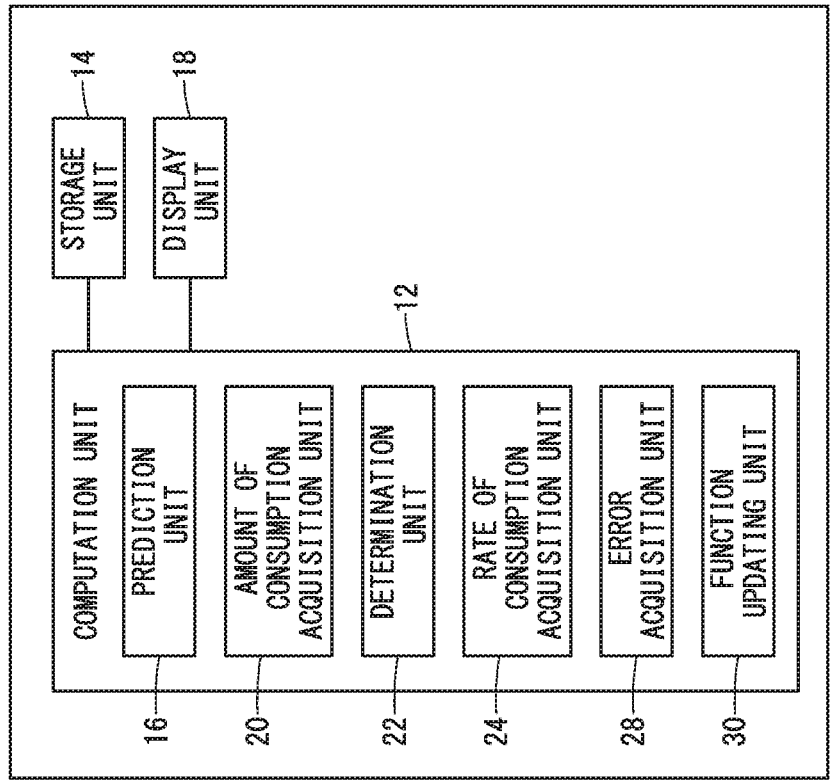

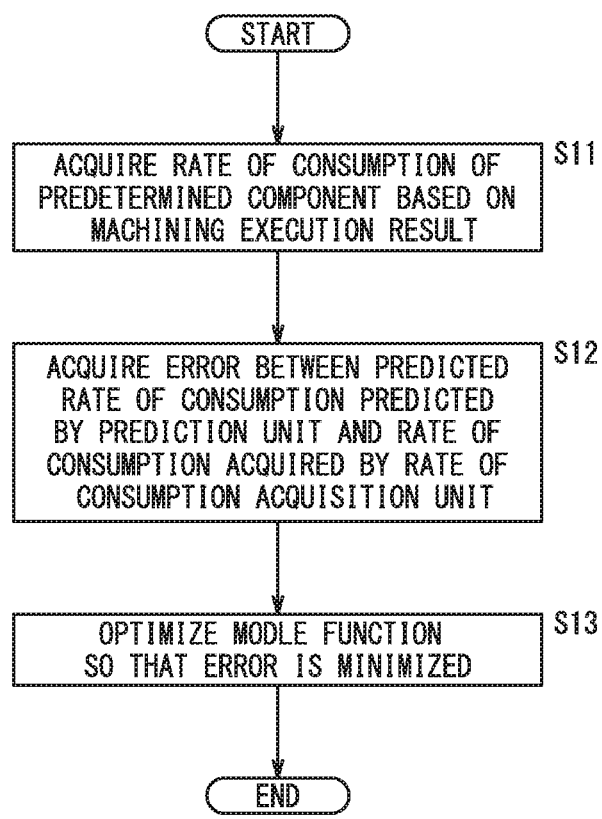

PREDICTION DEVICE

CROSS-REFERENCE TO RELATED APPLICATION

This application is based upon and claims the benefit of priority from Japanese Patent Application No. 2019-139531 filed on Jul. 30, 2019, the contents of which are incorporated herein by reference.

BACKGROUND OF THE INVENTION

Field of the Invention

The present invention relates to a prediction device used for managing a wire electrical discharge machine.

Description of the Related Art

In Japanese Laid-Open Patent Publication No. 07-178622, a wire monitoring device is proposed in which a degree of usage so far is displayed in relation to a plurality of components that constitute a wire feeding mechanism of a wire electrical discharge machine. Further, in Japanese Laid-Open Patent Publication No. 07-178622, it is described that, in accordance with the disclosed wire monitoring device, management of the lifetime of the wire feeding mechanism is facilitated.

SUMMARY OF THE INVENTION

Concerning the components that constitute the wire electrical discharge machine, techniques have been proposed with the aim of grasping how much wear and tear has occurred in such components so far. However, it has been difficult to grasp the extent to which the components will be consumed by machining to be performed in the future.

Thus, the present invention has the object of providing a prediction device that makes a prediction concerning the consumption of a component prior to machining, and issues a notification of the result of such a prediction.

One aspect of the present invention is characterized by a prediction device to which one or more wire electrical discharge machines are connected, the one or more wire electrical discharge machines each being configured to perform machining on an object to be machined according to a predetermined machining condition while moving a wire electrode relatively with respect to the object to be machined along a machining path, the prediction device comprising a prediction unit configured to predict, for a predetermined component constituting the wire electrical discharge machine, a predicted rate of consumption indicative of a rate of consumption based on the machining condition when the wire electrode is moved relatively by a unit distance, and a display unit configured to display the predicted rate of consumption of the component.

According to the present invention, the prediction device is provided, which makes a prediction concerning the consumption of a component prior to machining, and issues a notification of the result of such a prediction.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a schematic configuration diagram of a prediction device according to a second modification; and FIG. 6 is a flowchart showing an example of processing operations of the prediction device according to the second modification.

DESCRIPTION OF THE PREFERRED EMBODIMENTS

Hereinafter, a prediction device according to the present invention will be presented and described in detail below with reference to the accompanying drawings.

Embodiment

Figure 1:
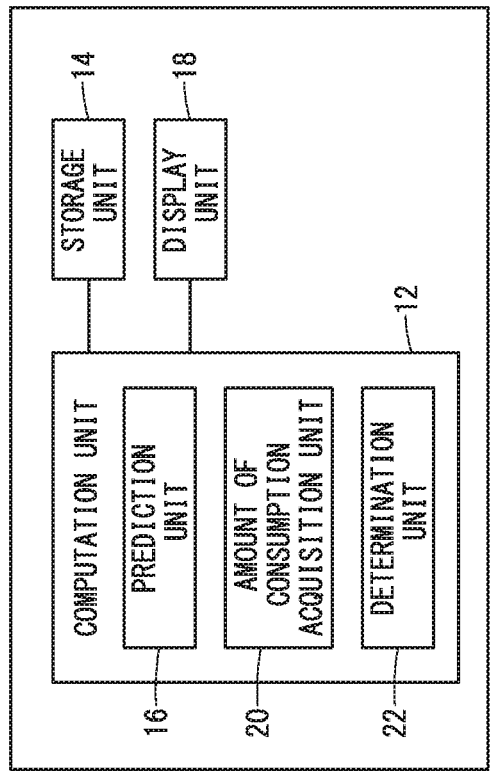
FIG. 1 is a schematic configuration diagram of a prediction device according to an embodiment.

FIG. 1 is a schematic configuration diagram of a prediction device 10 according to an embodiment.

The prediction device 10 is a computation device equipped with a computation unit (processor) 12 and a storage unit (memory) 14, and is operated by the computation unit 12 executing a predetermined program stored in the storage unit 14. To the prediction device 10, there is connected a wire electrical discharge machine that performs machining of an object to be machined according to predetermined machining conditions while moving a wire electrode relatively with respect to the object to be machined along a machining path.

The prediction device 10 is equipped with a prediction unit 16 that predicts, for a predetermined component constituting the wire electrical discharge machine, a predicted rate of consumption indicative of a rate of consumption based on the machining conditions when the wire electrode is moved relatively by a unit distance, and a display unit 18 that displays the predicted rate of consumption. Hereinafter, a description will be given sequentially of such elements.

The prediction unit 16 is included in the computation unit 12. As discussed previously, the prediction unit 16 predicts the predicted rate of consumption of a predetermined component on the basis of the predetermined machining conditions. The prediction unit 16 of the present embodiment includes a table in which the machining conditions are associated with predicted rates of consumption of the component, and the predicted rate of consumption is predicted by referring to the table. A table is prepared for each of respective types of predetermined components, and the content of each of such tables can be determined experimentally in advance.

The predetermined components that constitute the wire electrical discharge machine are not particularly limited, insofar as they are components that are considered to be consumed or undergo wear and tear due to machining, and for example, may be an electrode pin, a filter, or an ionic resin. The prediction unit 16 may predict the predicted rate of consumption for a plurality of components, or may predict the predicted rate of consumption for only one component.

The predetermined machining conditions are a combination of a plurality of control parameters created prior to execution of machining. Among the control parameters, there are included, for example, a speed of relative movement when the wire electrode is moved relatively with respect to the object to be machined, a magnitude of a voltage applied to the wire electrode, or a pause time during which application of the voltage is paused. Moreover, since the specific method of determining the content of the machining conditions is not the main topic of the present embodiment, description thereof will be omitted.

The machining conditions are possessed by the wire electrical discharge machine, and for example, are stored in a controller (CNC) provided in the wire electrical discharge machine. The prediction device 10 acquires, from the wire electrical discharge machine that is connected thereto, information concerning the machining conditions possessed by the wire electrical discharge machine.

The wire electrical discharge machine according to the present embodiment includes three machining conditions of "speed emphasis", "accuracy emphasis", and "surface roughness emphasis". The "speed emphasis" machining condition is a machining condition that is set for the purpose of completing machining in the shortest time possible. The "accuracy emphasis" machining condition is a machining condition that is set for the purpose of obtaining a shape that is as faithful as possible to the machining path. The "surface roughness emphasis" machining condition is a machining condition that is set for the purpose of making the cutting surface of the object to be machined as smooth as possible. By preparing the plurality of machining conditions in this manner, it is possible for an operator to appropriately select a desired machining condition.

Further, the prediction unit 16 may predict the predicted rate of consumption in relation to a plurality of the machining conditions, or may predict the predicted rate of consumption in relation to only one of the machining conditions that is selected by the operator. As an example, the prediction unit 16 according to the present embodiment predicts the predicted rate of consumption in relation to each of the speed emphasis, the accuracy emphasis, and the surface roughness emphasis machining conditions.

The display unit 18 includes a screen on which the predicted rate of consumption predicted by the prediction unit 16 is displayed. Consequently, the operator can operate the wire electrical discharge machine while taking into consideration the predicted rate of consumption displayed on the display unit 18. The display unit 18 may display not only the predicted rate of consumption, but also in combination therewith information concerning the machining conditions that form the basis for the prediction made by the prediction unit 16.

For example, it is assumed that the predicted rate of consumption of the filter concerning the speed emphasis machining condition is larger than the predicted rate of consumption of the filter concerning the other machining conditions. Although the operator may have initially had the intention of carrying out machining with emphasis placed on speed, the operator can determine prior to execution of machining that there is a high possibility that the lifetime of the filter will be disadvantageously exhausted in the middle of machining if machining is started in this way with emphasis placed on speed.

In this case, the operator can initiate machining after having replaced the filter with a new one. Alternatively, the operator can execute machining by selecting other machining conditions for which the predicted rate of consumption of the filter is relatively small.

The above is an example of the configuration of the prediction device 10 according to the present embodiment. According to the prediction device 10, any concern that machining may be interrupted due to consumption of the components that constitute the wire electrical discharge machine is reduced.

The prediction device 10 according to the embodiment is not limited to those features described above. For example, the prediction unit 16 may predict a predicted rate of consumption, and thereafter, may further predict a predicted amount of consumption indicative of an amount by which the component is consumed in the case that machining is executed. In this case, the display unit 18 may display the predicted amount of consumption.

The predicted amount of consumption is a value calculated on the basis of the machining path and the predicted rate of consumption. By displaying the predicted amount of consumption on the display unit 18, the operator can operate the wire electrical discharge machine while taking into consideration not only the predicted rate of consumption, but also the predicted amount of consumption that are displayed on the display unit 18.

Further, in the case of predicting the predicted amount of consumption, the computation unit 12 may further be equipped with an amount of consumption acquisition unit 20 that acquires an amount of consumption of the component so far, and a determination unit 22 that determines whether or not a total value of the amount of consumption of the component so far and the predicted amount of consumption predicted by the prediction unit 16 is greater than or equal to a threshold (see FIG. 1).

The amount of consumption of the component so far can be obtained, for example, by providing a sensor which is capable of detecting a state of the component in the wire electrical discharge machine, acquiring the amount of consumption due to machining by comparing the state of the component before and after machining, and cumulatively storing the acquisition result in the storage unit 14. In this case, by referring to the storage unit 14, the amount of consumption acquisition unit 20 can acquire the amount of consumption of the component so far. The method of acquiring the amount of consumption so far is not limited to the aforementioned technique, and for example, the amount of consumption so far may be acquired by storing in advance in the storage unit 14 a state of the component when the component is new, acquiring by a sensor the state of the component after completion of machining, and comparing the state after machining with the state when the component is new. Although the threshold may be set and modified as appropriate, it is, for example, a standard value of an amount of consumption at which a manufacturer of the component recommends that the component should be replaced.

A case in which the total value of the amount of consumption of the component so far and the predicted amount of consumption predicted by the prediction unit 16 is greater than or equal to the threshold represents a case in which there is a high possibility that the lifetime of the component will be disadvantageously exhausted during the middle of a subsequent machining process. Further, a case in which the aforementioned total value is less than the threshold represents a case in which there is a small possibility that the lifetime of the component will be exhausted during the middle of the subsequent machining process. Accordingly, by issuing a notification to the operator of the determination result, the operator can easily and appropriately determine whether or not a replacement operation of the component is necessary prior to execution of machining.

Further, a plurality of wire electrical discharge machines may be connected to the prediction device 10. In accordance with this feature, a system is constructed including the prediction device 10, and the plurality of wire electrical discharge machines connected to the prediction device 10. In such a system, the prediction device 10 may predict the predicted rate of consumption of a predetermined component based on predetermined machining conditions for each of the plurality of wire electrical discharge machines.

Further, the prediction device 10 connected to the wire electrical discharge machine may be a device that is integrated with the wire electrical discharge machine, insofar as they are functionally interconnected. For example, the CNC included in the wire electrical discharge machine may be equipped with the prediction unit 16, the display unit 18, the amount of consumption acquisition unit 20, and the determination unit 22 that have been described above.

Next, a flow of processing operations of the above-described prediction device 10 will be described. Moreover, hereinafter, a case will be described in which the prediction device 10 predicts not only the predicted rate of consumption, but also the predicted amount of consumption.

Figure 2:
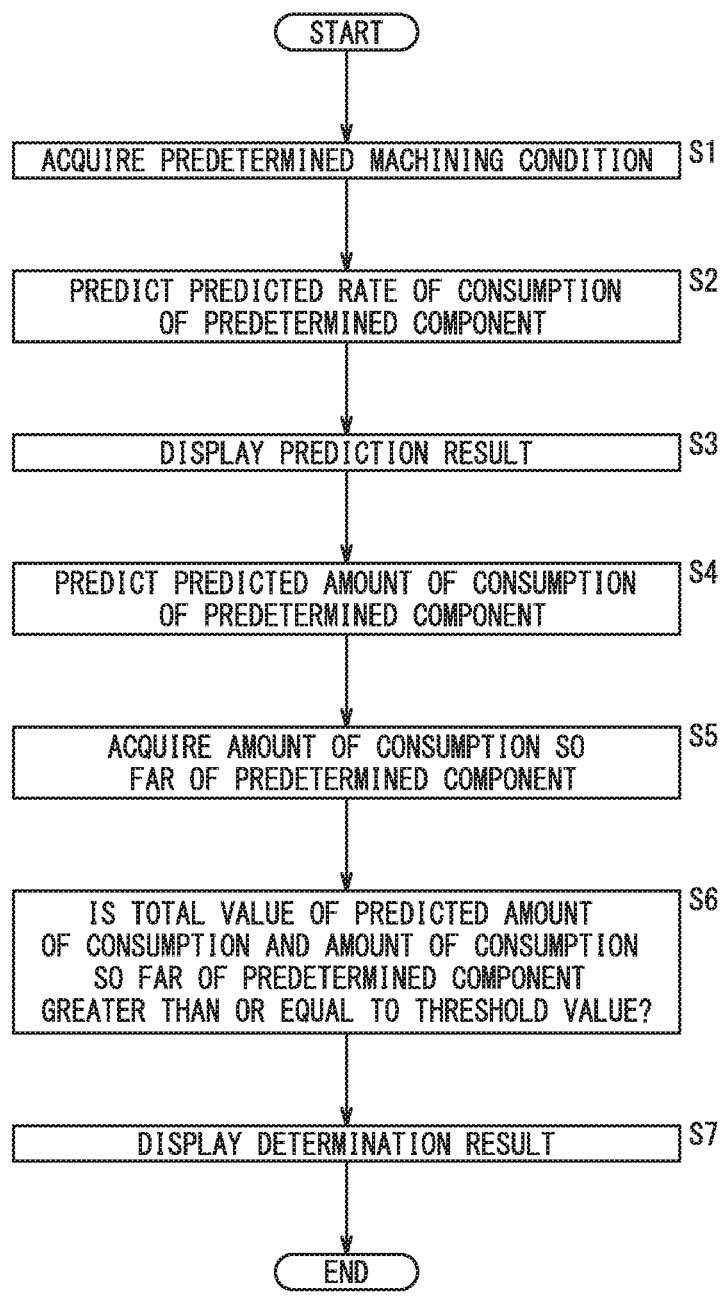
FIG. 2 is a flowchart showing an example of processing operations of the prediction device according to the embodiment.

FIG. 2 is a flowchart showing an example of processing operations of the prediction device 10 according to the embodiment.

First, the prediction device 10 acquires one or more predetermined machining conditions from the wire electrical discharge machine that is connected thereto (step S1). The prediction device 10 according to the present embodiment acquires three machining conditions including the speed emphasis machining condition, the accuracy emphasis machining condition, and the surface roughness emphasis machining condition.

Next, the prediction unit 16 of the prediction device 10 predicts the predicted rates of consumption of predetermined components based on the machining conditions acquired in step S1 (step S2). Based on the three respective processing conditions acquired in step S1, the prediction unit 16 of the present embodiment predicts the predicted rate of consumption of each of the electrode pin, the filter, and the ionic resin.

Next, the display unit 18 displays the prediction result of step S2 (the predicted rates of consumption of the predetermined components based on the machining conditions) (step S3). Consequently, the operator can select a desired machining condition while taking into consideration the predicted rates of consumption displayed on the display unit 18. Further, concerning any one of the three predetermined components, in the case that the predicted rate of consumption based on the machining condition desired by the operator is large, the operator may perform an operation to replace the concerned component.

Figure 3:
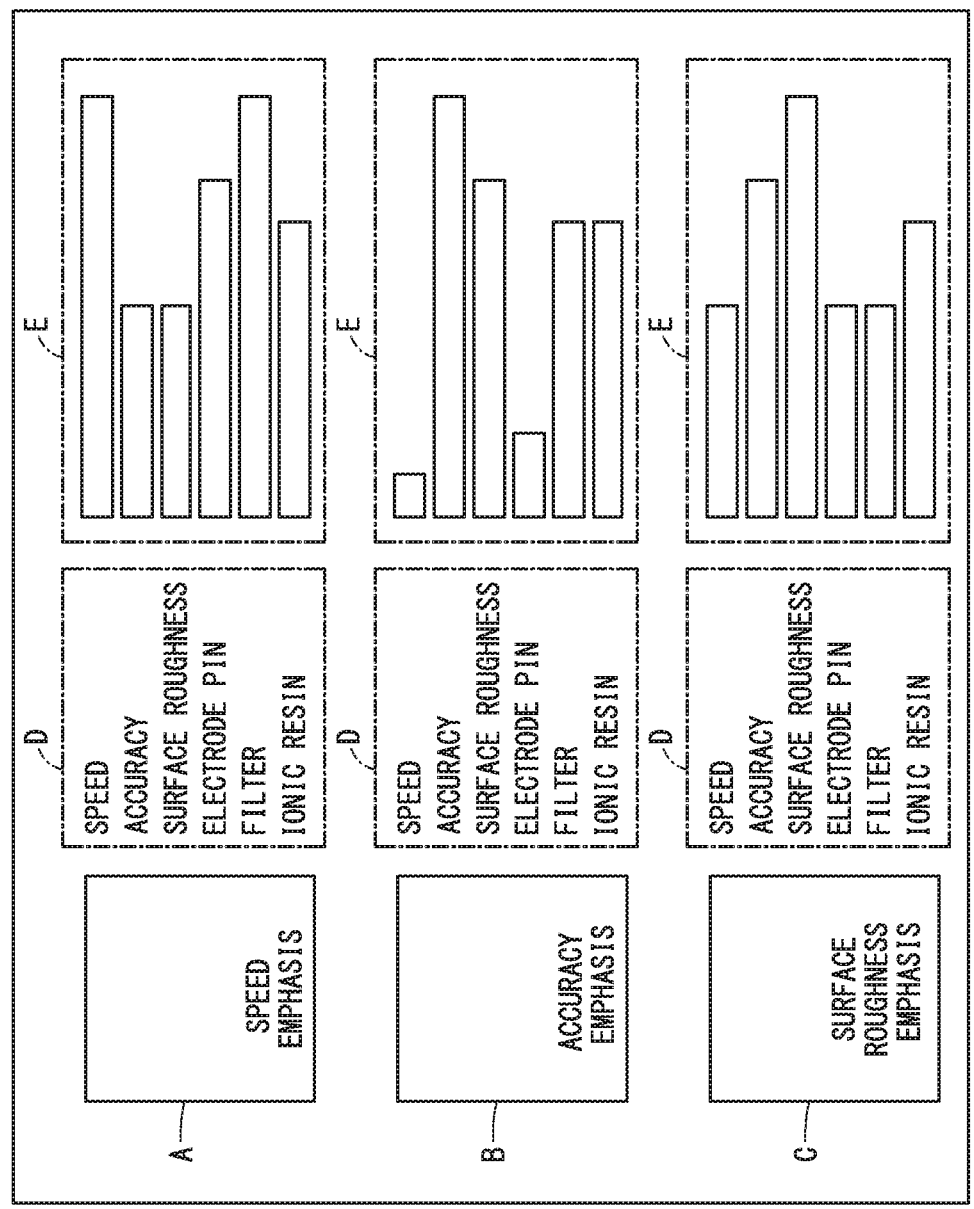
FIG. 3 is an example of a display format of a display unit according to the embodiment.

FIG. 3 is an example of the display format of the display unit 18 according to the embodiment.

Although the display format of the display unit 18 in step S3 is not limited, it is assumed that the display format is as shown in FIG. 3 in the present embodiment. In the example shown in FIG. 3, for each of icons A to C which indicate the machining conditions, item names D of information for the icons A to C, and bar graphs E indicating the information pertaining to the item names D are displayed to the right of the icons. The icons A, B, and C indicate in this order the speed emphasis machining condition, the accuracy emphasis machining condition, and the surface roughness machining condition. For each of the icons A to C, the lengths of the bar graphs E shown in the drawing on the right side of the speed, accuracy, and surface roughness among the item names D indicate how much emphasis or importance is placed on the items shown on the left side of the bars. Further, the lengths of the bar graphs E shown in the drawing on the right side of the electrode pin, the filter, and the ionic resin among the item names D indicate magnitudes of the predicted rates of consumption of the items shown on the left side of the bars based on the corresponding machining conditions.

When the operator selects a machining condition, the prediction unit 16 further predicts the predicted amounts of consumption (step S4). At this time, prior to predicting the predicted amounts of consumption, the prediction unit 16 acquires, from the wire electrical discharge machine that is connected thereto, information (for example, a machining program) related to the machining path. Consequently, based on the predicted rates of consumption and the machining path, the prediction unit 16 can predict the predicted amounts of consumption.

Next, the amount of consumption acquisition unit 20 acquires the amounts of consumption of the predetermined components so far (step S5). In addition to the method described previously, the amounts of consumption of the predetermined components so far may be acquired based on, for example, a general method related to managing the remaining lifetime of the components of a machine tool.

Next, the determination unit 22 calculates the total values of the predicted amounts of consumption and the amounts of consumption so far of the predetermined components, and determines whether or not the total values are greater than or equal to a threshold (step S6). It is assumed that the threshold is "an amount of consumption at which a manufacturer of the component recommends that the component should be replaced".

Next, the display unit 18 displays the determination result of step S6 (step S7). The display format of the determination result in step S7 is not particularly limited. For example, if the total value is greater than or equal to the threshold, it may be considered to display a message such as "A maintenance operation is recommended, because the lifetime of the predetermined component may be exhausted during the next machining process". In accordance with this feature, it is possible for the operator to easily and appropriately determine whether or not a maintenance operation is required for the predetermined component prior to execution of machining.

The foregoing description is one example of the processing operations of the prediction device 10 according to the embodiment.

Moreover, the processing operations of the prediction device 10 are not limited to those described above. For example, as stated previously, a description has been made in which, after having predicted the predicted rate of consumption based on each of the plurality of machining conditions, the operator is capable of selecting a machining condition while taking into consideration the predicted rate of consumption. However, the present invention is not limited to this feature, and the prediction device 10 may allow the operator to initially select a machining condition, and thereafter predict the predicted rate of consumption based on the selected machining condition. The operator may also modify the machining conditions, after having confirmed on the display unit 18 the predicted rate of consumption based on the machining condition selected by the operator. Further, for example, steps S4 to S7 may be omitted.

[Modifications]

Although the embodiment has been described as one example of the present invention, it goes without saying that various modifications or improvements can be added to the above-described embodiment. It is also apparent from the scope of the claims that embodiments to which such modifications and improvements are added should be incorporated in the technical scope of the present invention.

(Modification 1)

Figure 4:
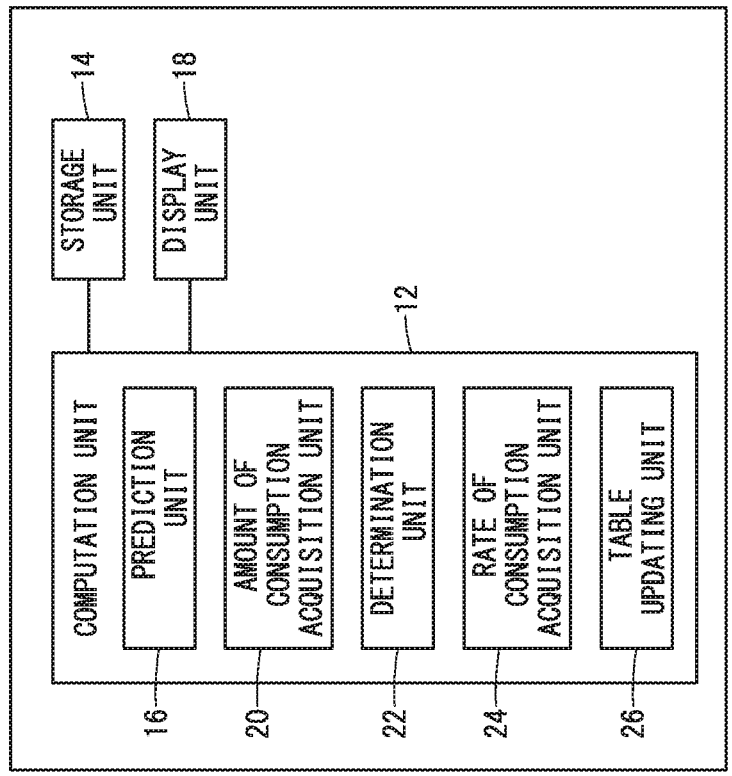
FIG. 4 is a schematic configuration diagram of a prediction device according to a first modification.

FIG. 4 is a schematic configuration diagram of a prediction device 10 according to a first modification (Modification 1).

The prediction device 10 may further be equipped with a rate of consumption acquisition unit 24 that acquires the rate of consumption of the component on the basis of an execution result of the machining, and a table updating unit 26 that updates the table on the basis of the rate of consumption acquired by the rate of consumption acquisition unit 24. In the example shown in FIG. 4, the rate of consumption acquisition unit 24 and the table updating unit 26 are included in the computation unit 12. For example, a sensor for observing the state of the component is provided beforehand in the wire electrical discharge machine, and the rate of consumption acquisition unit 24 acquires the rate of consumption of the component based on a comparison between states of the component before and after machining, and the machining path.

As has been described in the embodiment, the table that is referred to by the prediction unit 16 when predicting the predicted rate of consumption is experimentally obtained in advance. However, there is a concern that the rate of consumption of the predetermined component constituting the wire electrical discharge machine may change depending on the manner of usage of the wire electrical discharge machine, or alternatively the environment in which the wire electrical discharge machine is installed.

Thus, in the present modification, as described above, the table referred to by the prediction unit 16 is updated based on the execution result of the machining. In accordance with this feature, the prediction accuracy of the prediction unit 16 can be improved so as to be adapted to the manner of usage of the wire electrical discharge machine, or alternatively the environment in which the wire electrical discharge machine is installed.

(Modification 2)

FIG. 5 is a schematic configuration diagram of a prediction device 10 according to a second modification (Modification 2).

As stated previously, a description has been made in which the prediction unit 16 includes the table in which the machining conditions and the predicted rates of consumption are associated with each other, and the prediction unit 16 predicts the predicted rate of consumption by referring to the table. However, the present invention is not limited to this feature, and the prediction unit 16 may predict the predicted rate of consumption by way of a model function to which the machining conditions are input, and which outputs the predicted rate of consumption.

A description will now be given herein concerning the model function. Conceptually, the model function of the present modification has a structure that is generally referred to as a "multilayer neural network (neural network)". More specifically, the model function according to the present modification generates new values (neurons) by weighting and adding the respective components of an input vector, and applying a predetermined activation function to the result thereof. Generation of such neurons is performed a plurality of times on the same vector while changing the weights. Consequently, a plurality of neurons are generated based on the same vector, and a new vector is generated having the plurality of neurons as components thereof. The model function repeats the above-described weighting and addition with respect to the generated vectors, and ultimately generates (outputs) a single neuron.

In the case of the present modification, the vector that is initially input to the model function is a machining condition. The components of the vector are a plurality of control parameters included in the machining condition. Further, the neuron that the model function ultimately outputs is a neuron indicative of the predicted rate of consumption. The activation function possessed by the model function is not particularly limited, insofar as it is a function generally known as an activation function, and for example, is a ramp function.

The model function may be experimentally obtained and stored in the memory in advance, and referred to by the prediction unit 16 as appropriate. Consequently, the prediction device 10 is capable of predicting the predicted rate of consumption based on the machining conditions. In the present modification, when the prediction unit 16 predicts the predicted rate of consumption, a table in which the machining conditions and the predicted rates of consumption are associated with each other is unnecessary.

Concerning the predicted rate of consumption output by the model function, the accuracy thereof changes depending on the number of layers of the neural network (the number of times that vectors are generated), the type of the activation function of the model function, and the setting of the weights to be multiplied with the vector components. In relation thereto, in order to obtain an optimal model function for predicting the predicted rate of consumption by way of recursive learning, the prediction device 10 may be further equipped with the rate of consumption acquisition unit 24, an error acquisition unit 28, and a function updating unit 30. Hereinafter, a description will be given sequentially of such elements, while also taking in consideration a flow of the processing operations.

FIG. 6 is a flowchart showing an example of processing operations of the prediction device 10 according to Modification 2. Moreover, it is assumed that the step of "START" in FIG. 6 takes place after execution of machining by the wire electrical discharge machine.

The rate of consumption acquisition unit 24 is configured in the same manner as described in Modification 1. More specifically, after machining is executed, the rate of consumption acquisition unit 24 acquires the rate of consumption of the predetermined component based on the execution result of the machining (step S11).

The error acquisition unit 28 acquires an error between the predicted rate of consumption predicted by the prediction unit 16, and the rate of consumption acquired by the rate of consumption acquisition unit 24 (step S12). In this instance, the predicted rate of consumption and the acquired rate of consumption that are used to acquire the error are the values that are predicted and acquired for the same machining process, respectively. Consequently, the accuracy of the prediction of the prediction unit 16 with respect to the actual machining result is expressed numerically. The error is not limited simply to the "difference" between the predicted rate of consumption and the acquired rate of consumption, but may be determined as a value obtained by squaring such a "difference", for example.

The function updating unit 30 optimizes the model function in a manner so that the error acquired by the error acquisition unit 28 is minimized (step S13). Optimization of the model function is carried out by changing at least one of the weight, the number of layers of the multilayer neural network, and the activation function. At this time, in order to efficiently achieve optimization of the model function, a method and an algorithm, which are known in the field of mathematical programming for solving optimization problems, may be applied to the function updating unit 30.

In accordance with this feature, the prediction device 10 is capable of learning a model function which can predict the predicted rate of consumption with high accuracy.

Inventions that can be Obtained from the Embodiment

The inventions that can be grasped from the above-described embodiment and the modifications thereof will be described below.

The present invention discloses the prediction device (10), to which one or more wire electrical discharge machines are connected, the one or more wire electrical discharge machines each performing machining on an object to be machined according to a predetermined machining condition while moving a wire electrode relatively with respect to the object to be machined along a machining path, the prediction device comprising the prediction unit (16) that predicts, for a predetermined component constituting the wire electrical discharge machine, a predicted rate of consumption indicative of a rate of consumption based on the machining condition when the wire electrode is moved relatively by a unit distance, and the display unit (18) that displays the predicted rate of consumption of the component.

In accordance with such features, the prediction device (10) is provided, which makes a prediction concerning the consumption of the component prior to machining, and issues a notification of the result of such a prediction.

The prediction unit (16) may predict, on the basis of the machining path and the predicted rate of consumption, the predicted amount of consumption indicative of an amount by which the component is consumed in the case that the machining is executed, and the display unit (18) may display the predicted amount of consumption. In accordance with these features, it becomes easy for the operator to operate the wire electrical discharge machine while taking into consideration not only the predicted rate of consumption, but also the predicted amount of consumption.

There may further be provided the amount of consumption acquisition unit (20) that acquires the amount of consumption of the component so far, and the determination unit (22) that determines whether or not the total value of the amount of consumption of the component so far and the predicted amount of consumption predicted by the prediction unit (16) is greater than or equal to a threshold, and the display unit (18) may display the result of the determination by the determination unit (22). In accordance with this feature, it becomes easy for the operator to easily and appropriately determine whether or not a maintenance operation is required for a predetermined component prior to execution of machining.

The prediction unit (16) may include the table in which the machining condition and the predicted rate of consumption of the component are associated with each other, and may predict the predicted rate of consumption by referring to the table. In accordance with this feature, the prediction unit (16) can predict the rate of consumption of the predetermined component based on the predetermined machining condition by referring to the table.

There may further be provided the rate of consumption acquisition unit (24) that acquires the rate of consumption of the component on the basis of an execution result of the machining, and the table updating unit (26) that updates the table on the basis of the rate of consumption acquired by the rate of consumption acquisition unit (24). In accordance with this feature, the prediction accuracy of the prediction unit (16) can be improved so as to be adapted to the manner of usage of the wire electrical discharge machine, or alternatively the environment in which the wire electrical discharge machine is installed.

The prediction unit (16) may predict the predicted rate of consumption by the model function to which the machining condition is input, and which outputs the predicted rate of consumption. The prediction device (10) may further comprise the rate of consumption acquisition unit (24) that acquires the rate of consumption of the component on the basis of an execution result of the machining, the error acquisition unit (28) that acquires an error between the predicted rate of consumption predicted by the prediction unit (16) and the rate of consumption acquired by the rate of consumption acquisition unit (24), and the function updating unit (30) that optimizes the model function in a manner so that the error is minimized. In accordance with such features, the prediction device (10) is capable of predicting, by the model function, the predicted rate of consumption of the predetermined component based on the predetermined machining condition. Further, the prediction device (10) is capable of learning the model function that can predict the predicted rate of consumption with high accuracy.

The wire electrical discharge machine may be constituted by a plurality of the components, and the prediction unit (16) may make a prediction for the plurality of components. In accordance with this feature, the predicted rate of consumption and the predicted amount of consumption are predicted for the plurality of predetermined components that constitute the wire electrical discharge machine.

The wire electrical discharge machine may include a plurality of the machining conditions, and the prediction unit (16) may make a prediction concerning the plurality of machining conditions. In accordance with this feature, the predicted rate of consumption and the predicted amount of consumption are predicted concerning the plurality of predetermined machining conditions possessed by the wire electrical discharge machine.

What is claimed is:

1. A prediction device to which one or more wire electrical discharge machines are connected, the one or more wire electrical discharge machines each being configured to perform machining on an object to be machined according to a predetermined machining condition while moving a wire electrode relatively with respect to the object to be machined along a machining path, the prediction device comprising:
one or more processors that execute computer executable instructions stored in a memory; and
a display unit which includes a screen,
wherein the one or more processors execute the computer executable instructions to cause the prediction device:
to predict, for a predetermined consumable component constituting the wire electrical discharge machine and being consumed as the machining is performed, a predicted rate of consumption indicative of a rate of consumption indicative of a degree of consumption based on the machining condition when the wire electrode is moved relatively by a unit distance; and to display the predicted rate of consumption of the component on the screen, the memory stores a table in which the machining condition and the predicted rate of consumption of the component are associated with each other, and the processors cause the prediction device to predict the predicted rate of consumption by referring to the table.

2. The prediction device according to claim 1, wherein the processors cause the prediction device:

to predict, on a basis of the machining path and the predicted rate of consumption, a predicted amount of consumption indicative of an amount by which the component is consumed in a case that the machining is executed; and to display the predicted amount of consumption.

3. The prediction device according to claim 2, wherein the processors cause the prediction device:

to acquire an amount of consumption of the component;

to determine whether or not a total value of the amount of consumption of the component and the predicted amount of consumption predicted is greater than or equal to a threshold; and to display a result of the determination on the screen.

4. The prediction device according to claim 1, wherein the processors cause the prediction device:

to acquire the rate of consumption of the component on a basis of an execution result of the machining; and to update the table on a basis of the rate of consumption acquired.

5. A prediction device to which one or more wire electrical discharge machines are connected, the one or more wire electrical discharge machines each being configured to perform machining on an object to be machined according to a predetermined machining condition while moving a wire electrode relatively with respect to the object to be machined along a machining path, the prediction device comprising:

one or more processors that execute computer executable instructions stored in a memory; and a display unit which includes a screen, wherein the one or more processors execute the computer executable instructions to cause the prediction device:

to predict, for a predetermined consumable component constituting the wire electrical discharge machine and being consumed as the machining is performed, a predicted rate of consumption indicative of a rate of consumption indicative of a degree of consumption based on the machining condition when the wire electrode is moved relatively by a unit distance; and to display the predicted rate of consumption of the component on the screen, wherein the processors cause the prediction device:

to predict the predicted rate of consumption by a model function created in advance to which the machining condition is input, and which outputs the predicted rate of consumption;

to acquire the rate of consumption of the component on a basis of an execution result of the machining;

to acquire an error between the predicted rate of consumption and the rate of consumption; and to optimize the model function in a manner so that the error is minimized.

6. The prediction device according to claim 1, wherein:

the wire electrical discharge machine is constituted by a plurality of the components; and the processors cause the prediction device to predict the predicted rate of consumption of the plurality of components.

7. A prediction device to which one or more wire electrical discharge machines are connected, the one or more wire electrical discharge machines each being configured to perform machining on an object to be machined according to a predetermined machining condition while moving a wire electrode relatively with respect to the object to be machined along a machining path, the prediction device comprising:

one or more processors that execute computer executable instructions stored in a memory; and a display unit which includes a screen, wherein the one or more processors execute the computer executable instructions to cause the prediction device:

to predict, for a predetermined consumable component constituting the wire electrical discharge machine and being consumed as the machining is performed, a predicted rate of consumption indicative of a rate of consumption indicative of a degree of consumption based on the machining condition when the wire electrode is moved relatively by a unit distance; and to display the predicted rate of consumption of the component on the screen, wherein:

the machining condition comprises a plurality of machining conditions in which parameters used for the machining are set differently;

the predicted rate of consumption comprises a plurality of predicted rates of consumption;

the wire electrical discharge machine includes the plurality of machining conditions; and the processors cause the prediction device to predict the plurality of predicted rates of consumption based on the plurality of machining conditions.

* * * * *